United States Patent
Xu

(10) Patent No.: US 12,003,094 B2
(45) Date of Patent: Jun. 4, 2024

(54) PROTECTION APPARATUS FOR GALVANOMETER LASER SYSTEM AND OPERATING METHOD THEREOF

(71) Applicant: Peijian Xu, Guangzhou (CN)

(72) Inventor: Peijian Xu, Guangzhou (CN)

( * ) Notice: Subject to any disclaimer, the term of this patent is extended or adjusted under 35 U.S.C. 154(b) by 204 days.

(21) Appl. No.: 17/747,003

(22) Filed: May 18, 2022

(65) Prior Publication Data

US 2022/0278521 A1 Sep. 1, 2022

(30) Foreign Application Priority Data

Mar. 23, 2022 (CN) .......................... 202210289868.2

(51) Int. Cl.
*H02K 33/18* (2006.01)
*H02H 7/08* (2006.01)

(52) U.S. Cl.
CPC ..................................... *H02H 7/08* (2013.01)

(58) Field of Classification Search
CPC ....................................................... H02H 7/08
See application file for complete search history.

(56) References Cited

U.S. PATENT DOCUMENTS

| | | | |
|---|---|---|---|
| 2004/0227809 A1* | 11/2004 | Doi | H04N 1/00931 347/260 |
| 2005/0190422 A1* | 9/2005 | Sakai | G02B 26/0808 359/212.2 |
| 2008/0223834 A1 | 9/2008 | Griffiths et al. | |
| 2012/0114820 A1 | 5/2012 | Griffiths et al. | |
| 2017/0370834 A1* | 12/2017 | Kassab | G01J 3/10 |
| 2019/0383978 A1 | 12/2019 | Takazane | |
| 2021/0356853 A1* | 11/2021 | Chen | G02B 26/02 |

* cited by examiner

*Primary Examiner* — Muhammad S Islam

(57) ABSTRACT

The present disclosure provides a protection apparatus for a galvanometer laser system, including a system constituted by a galvanometer motor and a laser, wherein the apparatus further includes a protection device, the protection device including a monitoring element and a control element; wherein the monitoring element includes a current monitoring module configured to monitor an operating current of the system, a position monitoring module configured to monitor a swing position of the galvanometer motor, and a temperature monitoring module configured to monitor an operating temperature of the galvanometer motor; the control element includes a signal control module connected to a signal input terminal of the system, a laser switch module connected to the laser, and a galvanometer drive module connected to the galvanometer motor, a predetermined output signal being transmitted via the signal control module to the system; and based on various monitoring data of the monitoring element.

10 Claims, 5 Drawing Sheets

PROTECTION APPARATUS FOR GALVANOMETER LASER SYSTEM AND OPERATING METHOD THEREOF

TECHNICAL FIELD

The present disclosure relates to the technical field of galvanometers, and in particular, relates to a protection apparatus for a galvanometer laser system and an operating method thereof.

BACKGROUND

A galvanometer system is a high-precision and high-speed servo control system composed of a drive board and a high-speed swing motor, which is widely applied to such fields as laser material processing, biomedical detection, image and pattern processing, and stage lighting. A galvanometer laser lamp used in conventional stage performance mainly includes a galvanometer motor, a laser, and the like independent components. Operating signals of a current galvanometer laser system are not associated with the operating condition, and consequently, burn-out due to overload frequently occurs.

With respect to this problem, it is conventional in the field to achieve a simple protection by virtue of a simple analog circuit, with the principle of detecting a current of the motor, and then defining a fixed value. Specifically, when it is detected that the current exceeds the fixed value, the analog circuit is immediately triggered, and upon triggering of the analog circuit, outputs of the operating signals may be reduced by 50%, or the system is restarted upon a delay of several seconds. However, the defects are obvious. Specifically, (1) simple current sampling may only be implemented, and error and precision control is poor; (2) protection actions against current overload are single; (3) actions for overload protection are defined for fixed values, and adjustments are not convenient; (4) galvanometer motors of different models use different overload current values, which are hard to define; (5) trigger of protection is over-sensitive; since the current sampling is directed to a defined value, whereas the galvanometer operates dynamically and are subject to great changes, the protection action is immediately triggered once the defined value is exceeded; and in the case that the defined value is over-great, the trigger of protection is not responsive, thereby failing to achieve a protection effect.

SUMMARY

To overcome the defects in the related art, the present disclosure is intended to provide a protection apparatus for a galvanometer laser system and an operating method thereof.

To achieve the above objective, the present disclosure is practiced by the following technical solution. A protection apparatus for a galvanometer laser system is provided. The apparatus includes a system constituted by a galvanometer motor and a laser, wherein the apparatus further includes a protection device, the protection device including a monitoring element and a control element; wherein the monitoring element includes a current monitoring module configured to monitor an operating current of the system, a position monitoring module configured to monitor a swing position of the galvanometer motor, and a temperature monitoring module configured to monitor an operating temperature of the galvanometer motor; the control element includes a signal control module connected to a signal input terminal of the system, a laser switch module connected to the laser, and a galvanometer drive module connected to the galvanometer motor, a predetermined output signal being transmitted via the signal control module to the system; and based on various monitoring data of the monitoring element, the signal control module is enabled to control on or off of an output signal, the laser switch module is enabled to control on or off of the laser, and the galvanometer drive module is enabled to control on or off of the galvanometer motor.

Further, the control element includes a display module; wherein the display module is configured to display the various monitoring data of the monitoring element and various control actions of the control element.

Further, the protection device further includes a microprocessor; wherein an acquisition terminal of the microprocessor is connected to the monitoring element, and a control terminal of the microprocessor is connected to the control element.

An operating method of the protection apparatus for a galvanometer laser system is provided, wherein in the case that the system is in a normal operating state, the protection device is provided with a current protection mode, a temperature protection mode, and a position protection mode; wherein in the current protection mode, in the case that the current monitoring module monitors that the operating current is abnormal, the current protection mode is triggered;

in the temperature protection mode, in the case that the temperature monitoring module monitors that the operating temperature is abnormal, the temperature protection mode is triggered;

in the position protection mode, in the case that the position monitoring module monitors that the swing position is abnormal, the position protection mode is triggered; and in the case that any of the protection modes is triggered in the system, the control element of the protection device performs a corresponding control action.

Further, in the current protection mode, three levels of current monitoring intervals that are successively increasing are defined; wherein in the case that the current monitoring module monitors within a unit time period that the operating current is within a second-level current monitoring interval, the operating current is abnormal, and the current protection mode is triggered; and within a predetermined trigger time period t1, the signal control module controls the output signal transmitted to the system to decrease to a predetermined first signal value, and the other modules of the control element maintain an original state;

in the case that the current monitoring module monitors within a unit time period that the operating current is within a third-level current monitoring interval, the operating current is abnormal, and the current protection mode is triggered; and within a predetermined trigger time period t1, the signal control module interrupts transmission of the output signal to the system, the laser switch module turns off the laser, and the galvanometer drive module maintains an original state; and each time the predetermined trigger time period t1 expires, the active current protection mode is exited, and the control element of the protection device resumes to the original state, and the current monitoring module resumes to monitor the operating current.

Further, the three levels of current monitoring intervals include: a first-level current monitoring interval (0, 100%], the second-level current monitoring interval (100%, 150%], and the third-level current monitoring interval (150%, +∞).

Further, in the temperature protection mode, four levels of temperature monitoring intervals that are successively increasing are defined; wherein in the case that the temperature monitoring module monitors in real time that the operating temperature is within a second-level temperature monitoring interval, the operating temperature is abnormal, and the temperature protection mode is triggered; and within a predetermined trigger time period t2, the signal control module controls the output signal transmitted to the system to decrease to a predetermined first signal value, the other modules of the control element maintain an original state, and the temperature monitoring module constantly monitors the operating temperature in real time;

in the case that the temperature monitoring module monitors in real time that the operating temperature is within a third-level temperature monitoring interval, the operating temperature is abnormal, and the temperature protection mode is triggered; and within a predetermined trigger time period t2, the signal control module interrupts transmission of the output signal to the system, the laser switch module turns off the laser, the galvanometer drive module maintains an original state, and the temperature monitoring module constantly monitors the operating temperature in real time; or in the case that the temperature monitoring module monitors in real time that the operating temperature is within a fourth-level temperature monitoring interval, the operating temperature is abnormal, and the temperature protection mode is triggered; and the signal control module interrupts transmission of the output signal to the system, the laser switch module turns off the laser, the galvanometer drive module turns off the galvanometer motor, and the system is turned off and restarted; and each time the predetermined trigger time period t2 expires, the active temperature protection mode is exited, and the control element of the protection device resumes to the original state, and the temperature monitoring module monitors the operating temperature in real time.

Further, in the position protection mode, a rated swing interval is predefined; wherein in the case that the position monitoring module monitors in real time that the swing position exceeds the rated swing interval, the swing position is abnormal, the position protection mode is triggered, within a predetermined trigger time period t3, the signal control module controls the output signal transmitted to the system to decrease to the predetermined signal value, and the other control modules of the control element maintain an original state; and each time the predetermined trigger time period t3 expires, the active position protection mode is exited, the control element of the protection device resumes to an original state, and the position monitoring module resumes monitoring the swing position.

Further, in initial start of the system, the position monitoring module and the temperature monitoring module of the protection device pre judge whether monitoring data of the operating temperature and the swing position are acquired; wherein in the case that the monitoring data of the operating temperature and the swing position is normally acquired, the signal control module controls the output signal to be normally transmitted to the system, the laser switch module turns on the laser, the galvanometer drive module turns on the galvanometer motor, and the system resumes to a normal operating state; and in the case that any of the monitoring data fails to be normally acquired, the signal control module interrupts transmission of the output signal to the system, the laser switch module turns off the laser, and the galvanometer drive module turns off the galvanometer motor.

Further, in normal operating of the system, in the case that any of monitoring data of the operating current, the swing position, and the operating temperature fails to be acquired, the signal control module interrupts transmission of the output signal to the system, the laser switch module turns off the laser, and the galvanometer drive module turns off the galvanometer motor.

The present disclosure achieves the following beneficial effects: By monitoring various monitoring data of the system by the monitoring element, in the advent of system abnormalities, the signal control module, the laser switch module, and the galvanometer drive module of the control element perform corresponding control operations, such that the galvanometer motor and the laser are protected, the fault rate is greatly lowered, and the lifetime is effectively prolonged.

Figure 1:
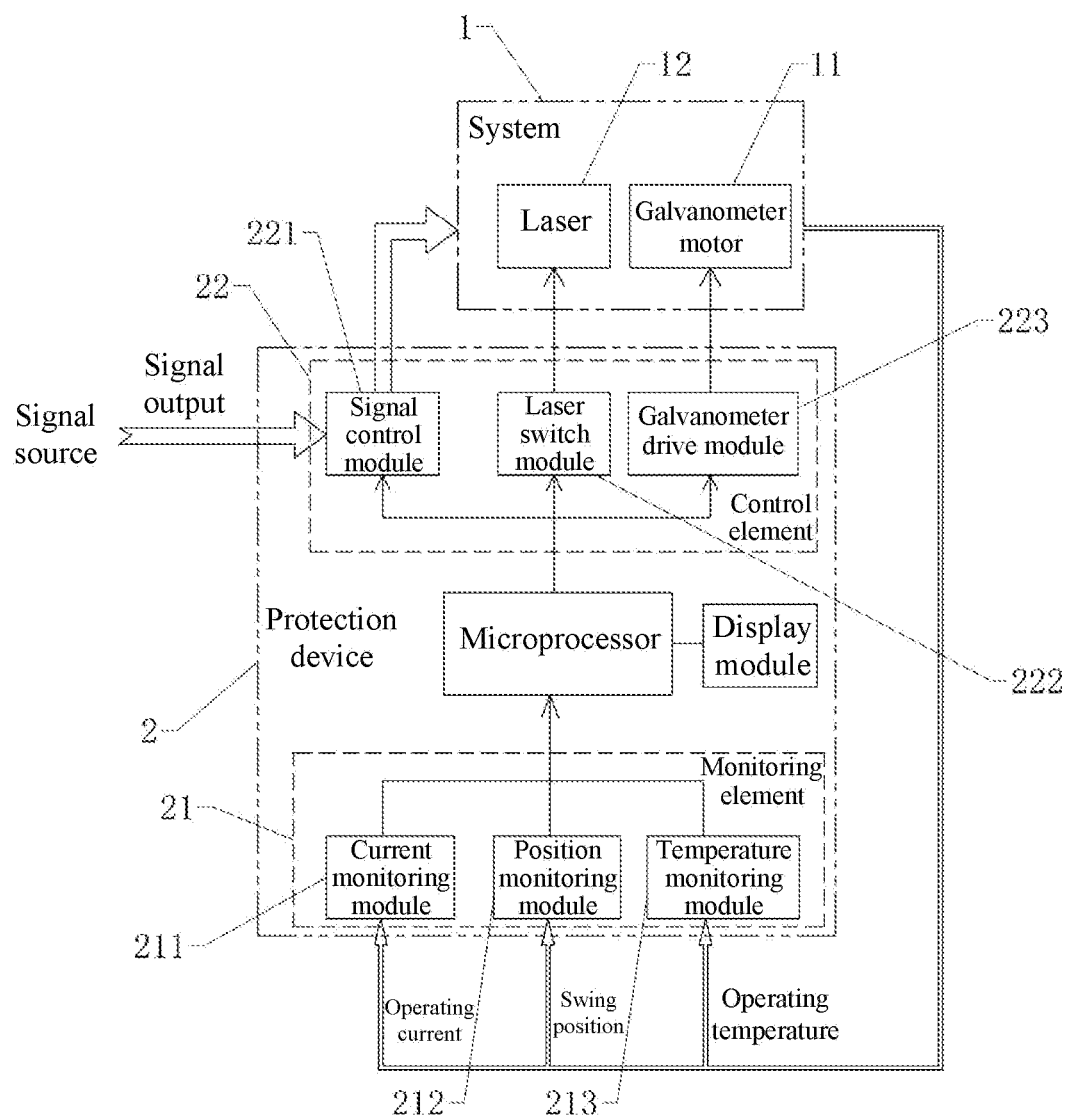
FIG. 1 is a schematic structural diagram of a protection apparatus for a galvanometer laser system.

Reference numerals and denotations thereof: 1—system; 11—galvanometer motor; 12—laser; 2—protection device; 21—monitoring element; 211—current monitoring module; 212—position monitoring module; 213—temperature monitoring module; 22—control element; 221—signal control module; 222—laser switch module; and 223—galvanometer drive module.

DETAILED DESCRIPTION

The technical solutions in the embodiments of the present disclosure are described in detail clearly and completely hereinafter with reference to the accompanying drawings for the embodiments of the present disclosure. Apparently, the described embodiments are only a portion of embodiments of the present disclosure, but not all the embodiments of the present disclosure. Based on the embodiments of the present disclosure, all other embodiments derived by persons of ordinary skill in the art without any creative efforts shall fall within the protection scope of the present disclosure.

Referring to FIG. 1, in this embodiment, a protection apparatus for a galvanometer laser system includes a system 1 and a protection device 2, wherein the system 1 is constituted by a galvanometer motor 11 and a laser 12. The protection device 2 further includes a microprocessor, a monitoring element 21, and a control element 22; wherein an acquisition terminal of the microprocessor is connected to the monitoring element 21, and a control terminal of the microprocessor is connected to the control element 22. The monitoring element 21 includes a current monitoring module 211 configured to monitor an operating current of the system 1, a position monitoring module 212 configured to monitor a swing position of the galvanometer motor 11, and a temperature monitoring module 213 configured to monitor an operating temperature of the galvanometer motor 11.

Specifically, the current monitoring module 211 according to this embodiment acquires current monitoring data by virtue of a current sensor (for example, an electromagnetic current transformer, an electronic current transformer, or the like) pre-configured on the system 1, such that the operating current of the system 1 is monitored. The position monitoring module 212 according to this embodiment acquires position monitoring data of the galvanometer motor 11 (a reflective sheet thereof) in X and Y axis directions by virtue of a position sensor (for example, a contact position sensor, a proximity position sensor, or the like) pre-configured on the system 1, such that the swing position of the galvanometer motor 11 is monitored. The temperature monitoring module 213 according to this embodiment acquires temperature monitoring data of the galvanometer motor 11 by virtue of a temperature sensor (for example, a thermal sensitive sensor) pre-configured on the system 1, such that the operating temperature of the galvanometer motor 11 is monitored. The current monitoring module 211, the position monitoring module 212, and the temperature monitoring module 213 transmit the acquired monitoring data to the microprocessor for data processing. The microprocessor according to this embodiment is a microcontroller unit (MCU), a central processing unit (CPU), a programmable logic controller (PLC), or the like computer processor. The structure and principle thereof are common knowledge in the art, which are not described herein any further.

In this embodiment, the control element 22 includes a signal control module 221 connected to a signal input terminal of the system 1, a laser switch module 222 connected to the laser 12, and a galvanometer drive module 223 connected to the galvanometer motor 11. Specifically, an external predetermined signal source sends an output signal, the output signal is transmitted via the signal control module 221 to the signal input terminal of the system 1. In this case, the galvanometer motor 11 and the laser 12 in the system 1 perform corresponding actions based on the output signal, and the signal control module 221 is configured to control on/off of the output signal. In this embodiment, the laser switch module 222 is configured to control on/off of the laser 12, and the galvanometer drive module 223 is configured to control on/off of the galvanometer motor 11. The microprocessor may send a control instruction to the signal control module 221, the laser switch module 222, and the galvanometer drive module 223, such that, based on the various monitoring data of the monitoring element 21, the signal control module 221 controls on or off of the output signal, the laser switch module 222 controls on or off of the laser 12, and the galvanometer drive module 223 controls on or off of the galvanometer motor 11. Further, the microprocessor implements on/off of the output signal by sending a corresponding control instruction to the signal control module 221, and the microprocessor implements on/off by sending a high level signal and a low level signal to the laser switch module 222 and the galvanometer drive module 223 respectively.

In this embodiment, the control element 22 includes a display module. The display module is configured to display various monitoring data of the monitoring element 21 and various control actions of the control element 22. Specifically, the display module is preferably a display screen to visually present the various data and operating information of the system 1 and the protection apparatus. The structure and principle thereof are common knowledge in the art, which are not described hereinafter.

For ease of understanding of the protection apparatus for the galvanometer laser system, further interpretation is given hereinafter with reference to a specific operating method.

Figure 2:
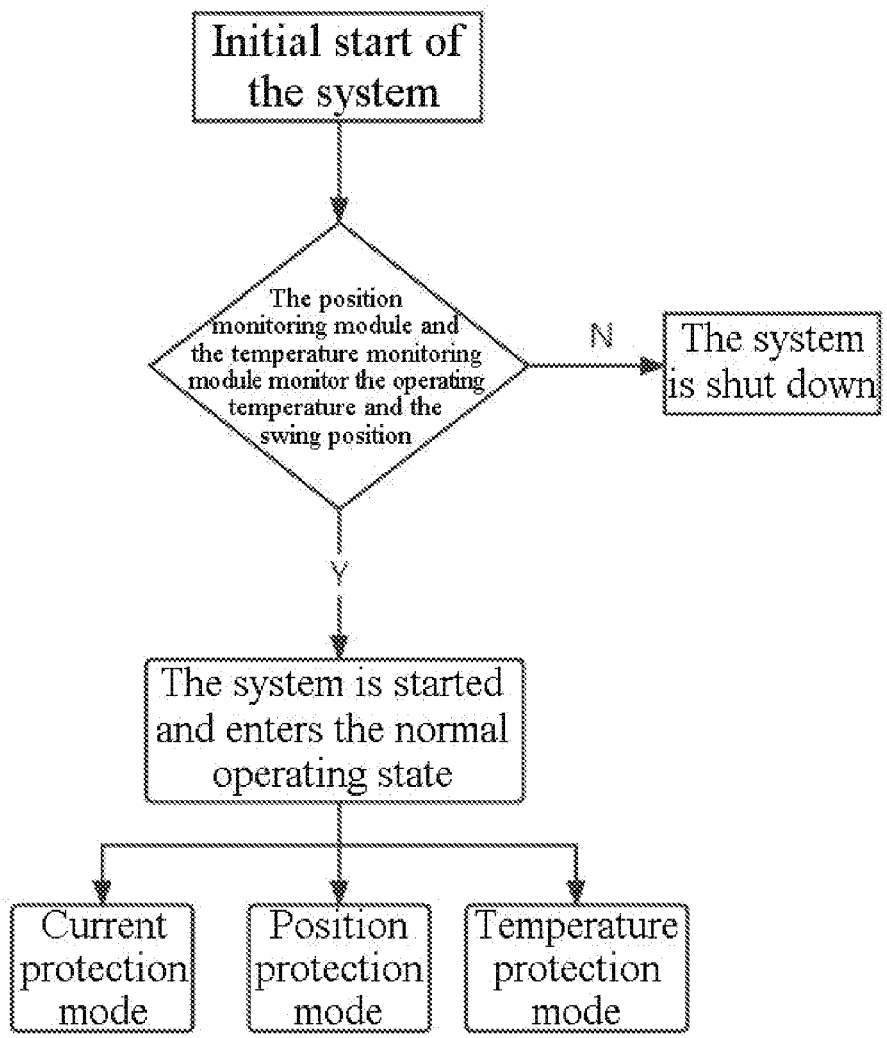
FIG. 2 is a schematic flowchart of a protection mode of the protection apparatus.

As illustrated in FIG. 2, in this embodiment, an operating method of the protection apparatus for the galvanometer laser system is provided, wherein in the case that the system 1 is in a normal operating state, the protection device 2 is provided with a current protection mode, a temperature protection mode, and a position protection mode. That is, the current protection mode, the temperature protection mode, and the position protection mode are applicable to the system 1 in the normal operating state. In initial start of the system 1, the position monitoring module 212 and the temperature monitoring module 213 of the protection device 2 pre judge whether monitoring data of the operating temperature and the swing position are acquired; wherein in the case that the monitoring data of the operating temperature and the swing position is normally acquired, the signal control module 221 controls the output signal to be normally transmitted to the system 1, the laser switch module 222 turns on the laser 12, the galvanometer drive module 223 turns on the galvanometer motor 11, and the system 1 resumes to a normal operating state, and in this case, the galvanometer motor 11 and the laser 12 are capable of operating normally; and in the case that any (the operating temperature and/or the swing position) of the monitoring data fails to be normally acquired, the signal control module 221 interrupts transmission of the output signal to the system 1, the laser switch module 222 turns off the laser 12, the galvanometer drive module 223 turns off the galvanometer motor 11, and the system 1 does not operate, thereby protecting the system 1 and preventing damages caused by the laser 12 to human bodies.

Figure 3:
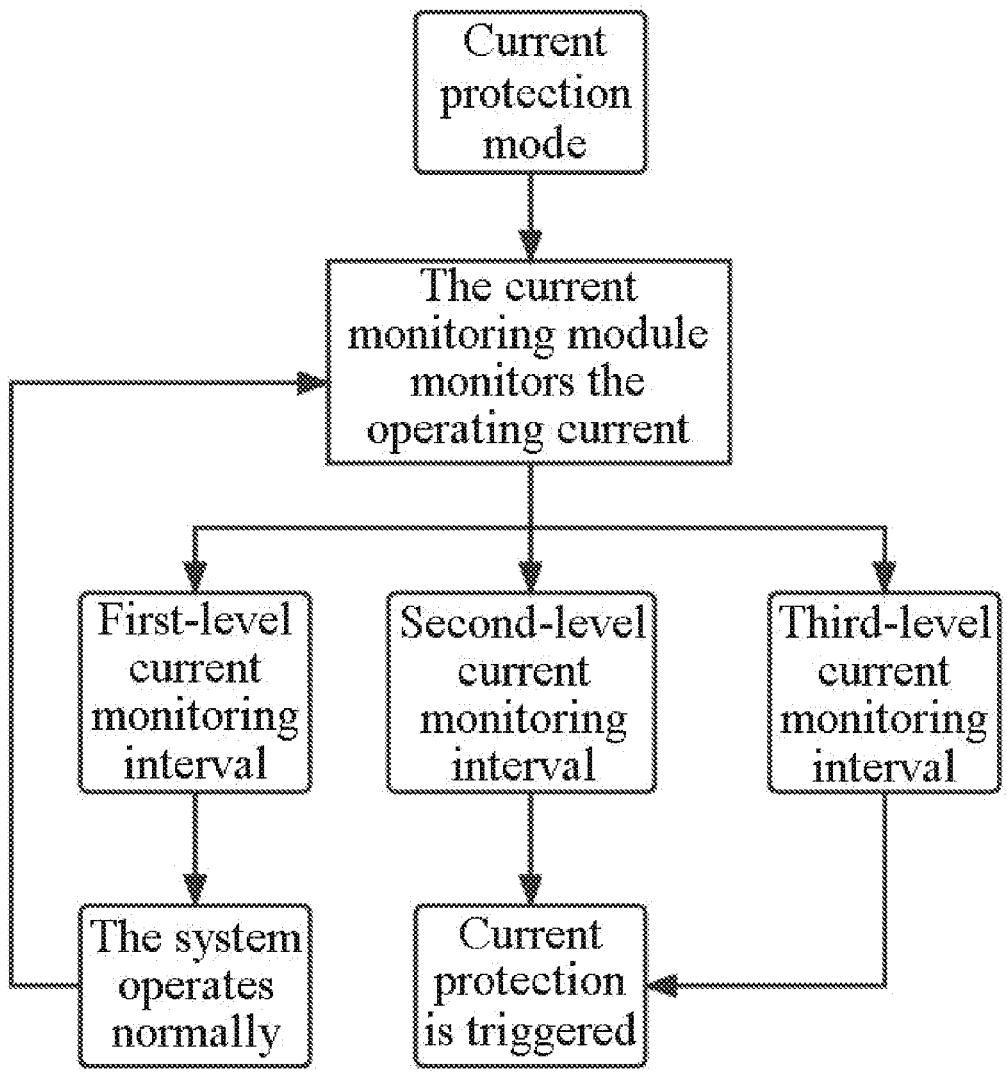
FIG. 3 is a schematic flowchart of a current protection mode.

As illustrated in FIG. 3, in this embodiment, in the current protection mode, in the case that the current monitoring module 211 monitors that the operating current is abnormal, the current protection mode is triggered; Specifically, three levels of current monitoring intervals are defined in the current protection mode. The three levels of current monitoring intervals include: a first-level current monitoring interval (0, 100%], the second-level current monitoring interval (100%, 150%], and the third-level current monitoring interval (150%, +∞). The first-level current monitoring interval is a reasonable interval in the case that the system 1 is in the normal operating state.

Further, in the case that the current monitoring module 211 monitors within a unit time period that the operating current is within a second-level current monitoring interval, the operating current is abnormal, and the current protection mode is triggered; and within a predetermined trigger time period t1 (herein, t1 is preferably 10 s), the signal control module 221 controls the output signal transmitted to the system 1 to decrease to a predetermined first signal value (preferably, a 50% output amount), and the other modules of the control element 22 maintain an original state (that is, the laser switch module 222 turns on the laser 12, and the galvanometer drive module 223 turns on the galvanometer motor 11). In this case, each time the predetermined trigger time period t1 expires, the active current protection mode is exited, and the control element 22 of the protection device 2 resumes to the original state (the signal control module 221 controls the output signal to be transmitted to the system 1 at a 100% output amount), and the current monitoring module 211 resumes monitoring the operating current.

Further, in the case that the current monitoring module 211 monitors within a unit time period that the operating current is within a third-level current monitoring interval, the operating current is abnormal, and the current protection mode is triggered; and within the predetermined trigger time period t1 (herein, t1 is preferably 10 s), the signal control module 221 interrupts transmission of the output signal to the system 1, the laser switch module 222 turns off the laser 12, and the galvanometer drive module 223 maintains an original state (that is, the galvanometer drive module 223 turns on the galvanometer motor 11). In this case, each time the predetermined trigger time period t1 expires, the active current protection mode is exited, and the control element 22 of the protection device 2 resumes to the original state (the signal control module 221 controls the output signal to be transmitted to the system 1 at a 100% output amount, and the laser switch module 222 turns on the laser 12), and the current monitoring module 211 resumes monitoring the operating current.

Under the current protection effects of the two current protection modes within the second-level current monitoring interval and the third-level current monitoring interval, the system 1 may resume to the normal operating state, that is, the operating current is within the first-level current monitoring interval, thereby effectively avoiding damages caused by overload.

Secondly, in a period where the current protection mode is triggered, the current monitoring module 211 does not monitor the operating current, but monitors the operating current until the predetermined trigger time period t1 expires and the current protection mode is exited. In this way, the current protection mode is prevented from being frequently triggered, and thus the load of the protection device 2 may be not over-great.

Figure 4:
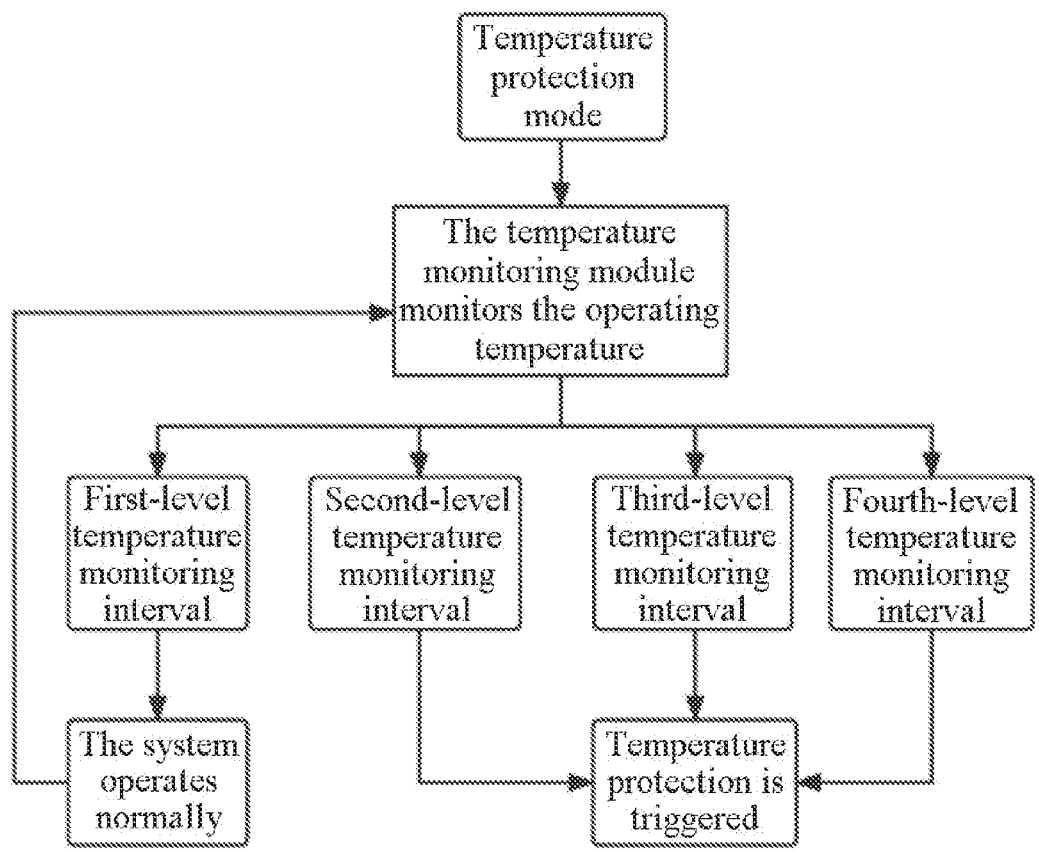
FIG. 4 is a schematic flowchart of a temperature protection mode.

As illustrated in FIG. 4, in this embodiment, in the temperature protection mode, four levels of temperature monitoring intervals that are successively increasing are defined. The four levels of temperature monitoring intervals include: a first-level temperature monitoring interval (0, 54.9], a second-level temperature monitoring interval [55, 57.9], a third-level temperature monitoring interval [58, 61.9], and a fourth-level temperature monitoring interval [62, +∞). Herein, the first-level temperature monitoring interval is a reasonable interval of the system 1 in the operating state.

Further, in the case that the temperature monitoring module 213 monitors in real time that the operating temperature is within a second-level temperature monitoring interval, the operating temperature is abnormal, and the temperature protection mode is triggered; and within a predetermined trigger time period t2 (herein, t2 is preferably 30 s), the signal control module 221 controls the output signal transmitted to the system 1 to decrease to the predetermined first signal value (preferably, a 50% output amount), and the other modules of the control element 22 maintain an original state (that is, the laser switch module 222 turns on the laser 12, the galvanometer drive module 223 turns on the galvanometer motor 11, and the temperature monitoring module 213 continues monitoring the operating temperature in real time.

in the case that the temperature monitoring module 213 monitors in real time that the operating temperature is within a third-level temperature monitoring interval, the operating temperature is abnormal, and the temperature protection mode is triggered; and within the predetermined trigger time period t2 (herein, t2 is preferably 60 s), the signal control module 221 interrupts transmission of the output signal to the system 1, the laser switch module 222 turns off the laser 12, the galvanometer drive module 223 maintains an original state (that is, the galvanometer drive module 223 turns on the galvanometer motor 11), and the temperature monitoring module 213 constantly monitors the operating temperature in real time.

Further, in the case that the temperature monitoring module 213 monitors in real time that the operating temperature is within a fourth-level temperature monitoring interval, the operating temperature is abnormal, and the temperature protection mode is triggered; and the signal control module 221 interrupts transmission of the output signal to the system 1, the laser switch module 222 turns off the laser 12, the galvanometer drive module 223 turns off the galvanometer motor 11, and the system 1 is turned off and restarted; and in the case, the predetermined trigger time period t2 is not defined for the temperature protection mode, and in this state, the operating temperature of the system 1 is high, and the system 1 needs to be restarted such that the galvanometer motor 11 restarts operating.

Further, each time the predetermined trigger time period t2 expires, the active temperature protection mode is exited, and the control element 22 of the protection device 2 resumes to the original state (the signal control module 221 controls the output signal to be transmitted to the system 1 at a 100% output amount, the laser switch module 222 turns on the laser 12, and the galvanometer drive module 223 turns on the galvanometer motor 11), and the temperature monitoring module 213 monitors the operating temperature in real time. Under the temperature protection effect of the three temperature protection modes within the second-level temperature monitoring interval, the third-level temperature monitoring interval, and the fourth-level temperature monitoring interval, the operating temperature of the system 1 may be reduced to be within the first-level temperature monitoring interval, and the system 1 operates under a normal temperature, thereby effectively avoiding damages caused by over-temperatures.

In addition, in the case that it is monitored within the predetermined trigger time period t2 where the temperature protection mode is triggered, that the operating temperature exceeds the current temperature monitoring interval, a control action corresponding to a next-level temperature monitoring interval is immediately triggered, instead of waiting for expiration of the predetermined trigger time period t2. Specifically, where a protection mode is triggered because the operating temperature is within the second-level temperature monitoring interval and the corresponding control action is performed within the predetermined trigger time period t2, in the case that it is monitored that the operating temperature is within the third-level temperature monitoring interval, a corresponding control action is immediately performed and the predetermined trigger time period t2 is re-timed. Where a protection mode is triggered because the operating temperature is within the third-level temperature monitoring interval and the corresponding control action is performed within the predetermined trigger time period t2, in the case that it is monitored that the operating temperature is within the fourth-level temperature monitoring interval, a corresponding control action is immediately performed, and the system 1 is turned off and restarted. By monitoring the operating temperature in real time and performing dynamic control actions, abnormalities of the operating temperature may be detected in time, and the corresponding control action may be immediately performed, thereby effectively protecting the system 1.

Figure 5:
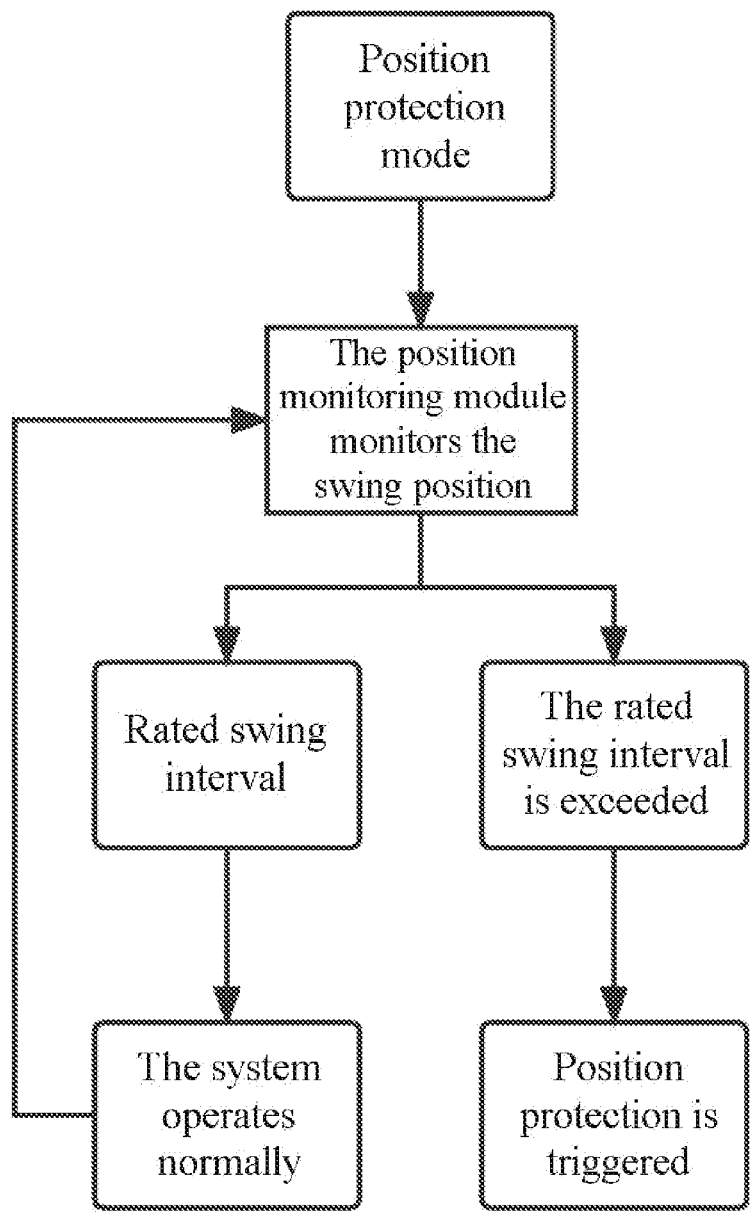
FIG. 5 is a schematic flowchart of a position protection mode.

As illustrated in FIG. 5, in this embodiment, in the position protection mode, a rated swing interval is defined. In the case that the position monitoring module 212 monitors in real time that the swing position exceeds the rated swing interval, the swing position is abnormal, and the position protection mode is triggered; and within a predetermined trigger time period t3 (herein, t3 is preferably 10 s), the signal control module 221 controls the output signal transmitted to the system 1 to decrease to the predetermined first signal value (preferably, a 50% output amount), and the other modules of the control element 22 maintain an original state (that is, the laser switch module 222 turns on the laser 12, and the galvanometer drive module 223 turns on the galvanometer motor 11). In this case, each time the predetermined trigger time period t3 expires, the active position protection mode is exited, and the control element 22 of the protection device 2 resumes to the original state (the signal control module 221 controls the output signal to be transmitted to the system 1 at a 100% output amount, the laser switch module 222 turns on the laser 12, and the galvanometer drive module 223 turns on the galvanometer motor 11), and the position monitoring module 212 resumes monitoring the swing position.

In this embodiment, in the case that any of the protection modes is triggered in the system 1, the control element 22 of the protection device 2 performs a corresponding control action. In addition, to prevent conflicts or mutual interference between the protection modes in an actual operating period, it is defined herein, in the actual operating period, that where the protection modes are triggered in sequence, a previous protection mode is exited, and a new protection mode is triggered and a corresponding new control action is performed. A person skilled in the art may define priorities according to actual product requirements, which is not limited herein.

In this embodiment, in the case that any of monitoring data of the operating current, the swing position, and the operating temperature fails to be acquired, the signal control module 221 interrupts transmission of the output signal to the system 1, the laser switch module 222 turns off the laser 12, and the galvanometer drive module 223 turns off the galvanometer motor 11. Specifically, in the case that the current monitoring module 221 fails to monitor the operating current of the system 1, a cable failure occurs between the current monitoring module 211 and the system 1, or a current sensor between the current monitoring module 211 and the system 1 is damaged, and as a result, a corresponding control action is performed to immediately shut down the system 1. In the case that the position monitoring module 212 fails to monitor the swing position of the galvanometer motor 11, a cable failure occurs between the position monitoring module 212 and the system 1, or a position sensor between the position monitoring module 212 and the system 1 is damaged, and as a result, a corresponding control action is performed to immediately shut down the system 1. In the case that the temperature monitoring module 213 fails to monitor the operating temperature of the system 1, a cable failure occurs between the temperature monitoring module 213 and the system 1, or a temperature sensor between the current monitoring module 213 and the system 1 is damaged, and as a result, a corresponding control action is performed to immediately shut down the system 1.

Signal transmission circuits for, such as communication and transmission between the various modules and microprocessors, and data interactions, such as monitoring, determination, control, and instructions for the various modules all fall within the category of computer programs, and relates to processors and software programs of computers, which are not described and defined any further. The structure and principle of the circuits and the interactions are common technical means in the art for a person skilled in the art. Further, the processors involved in the various modules may employ any one of a dedicated computer, a computer system (including, for example, a micro-computer, a small-sized computer or host, a programming micro-processor, and a micro-controller), a peripheral integrated circuit element, a customer-specific integrated circuit (CSIC), or an application-specific integrated circuit (ASIC), or any other integrated circuit, logic circuit, digital signal processor, a programmable logic device (such as an FPGA, a PLD, a PLA, or a PAL), or any other device or device configuration capable of performing the steps of the process of the present disclosure.

The above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the claims.

What is claimed is:

1. A protection apparatus for a galvanometer laser system, comprising a system constituted by a galvanometer motor and a laser, wherein the apparatus further comprises a protection device, the protection device comprising a monitoring element and a control element; wherein the monitoring element comprises a current monitoring module configured to monitor an operating current of the system, a position monitoring module configured to monitor a swing position of the galvanometer motor, and a temperature monitoring module configured to monitor an operating temperature of the galvanometer motor; the control element comprises a signal control module connected to a signal input terminal of the system, a laser switch module connected to the laser, and a galvanometer drive module connected to the galvanometer motor, a predetermined output signal being transmitted via the signal control module to the system; and based on various monitoring data of the monitoring element, the signal control module is enabled to control on or off of an output signal, the laser switch module is enabled to control on or off of the laser, and the galvanometer drive module is enabled to control on or off of the galvanometer motor.

2. The protection apparatus for the galvanometer laser system according to claim 1, wherein the control element comprises a display module; wherein the display module is configured to display the various monitoring data of the monitoring element and various control actions of the control element.

3. The protection apparatus for the galvanometer laser system according to claim 1, wherein the protection device further comprises a microprocessor; wherein an acquisition terminal of the microprocessor is connected to the monitoring element, and a control terminal of the microprocessor is connected to the control element.

4. An operating method of the protection apparatus for the galvanometer laser system as defined in claim 1, wherein in the case that the system is in a normal operating state, the protection device is provided with a current protection mode, a temperature protection mode, and a position protection mode; wherein in the current protection mode, in the case that the current monitoring module monitors that the operating current is abnormal, the current protection mode is triggered;

in the temperature protection mode, in the case that the temperature monitoring module monitors that the operating temperature is abnormal, the temperature protection mode is triggered;

in the position protection mode, in the case that the position monitoring module monitors that the swing position is abnormal, the position protection mode is triggered; and in the case that any of the protection modes is triggered in the system, the control element of the protection device performs a corresponding control action.

5. The operating method of the protection apparatus for the galvanometer laser system according to claim 4, wherein in the current protection mode, three levels of current monitoring intervals that are successively increasing are defined; wherein in the case that the current monitoring module monitors within a unit time period that the operating current is within a second-level current monitoring interval, the operating current is abnormal, and the current protection mode is triggered; and within a predetermined trigger time period t1, the signal control module controls the output signal transmitted to the system to decrease to a predetermined first signal value, and the other modules of the control element maintain an original state;

in the case that the current monitoring module monitors within a unit time period that the operating current is within a third-level current monitoring interval, the operating current is abnormal, and the current protection mode is triggered; and within a predetermined trigger time period t1, the signal control module interrupts transmission of the output signal to the system, the laser switch module turns off the laser, and the galvanometer drive module maintains an original state; and each time the predetermined trigger time period t1 expires, the active current protection mode is exited, and the control element of the protection device resumes to the original state, and the current monitoring module resumes monitoring the operating current.

6. The operating method of the protection apparatus for the galvanometer laser system according to claim 5, wherein the three levels of current monitoring intervals comprise: a first-level current monitoring interval (0, 100%], the second-level current monitoring interval (100%, 150%], and the third-level current monitoring interval (150%, +∞).

7. The operating method of the protection apparatus for the galvanometer laser system according to claim 4, wherein in the temperature protection mode, four levels of temperature monitoring intervals that are successively increasing are defined; wherein in the case that the temperature monitoring module monitors in real time that the operating temperature is within a second-level temperature monitoring interval, the operating temperature is abnormal, and the temperature protection mode is triggered; and within a predetermined trigger time period t2, the signal control module controls the output signal transmitted to the system to decrease to a predetermined first signal value, the other modules of the control element maintain an original state, and the temperature monitoring module constantly monitors the operating temperature in real time;

in the case that the temperature monitoring module monitors in real time that the operating temperature is within a third-level temperature monitoring interval, the operating temperature is abnormal, and the temperature protection mode is triggered; and within a predetermined trigger time period t2, the signal control module interrupts transmission of the output signal to the system, the laser switch module turns off the laser, the galvanometer drive module maintains an original state, and the temperature monitoring module constantly monitors the operating temperature in real time; or in the case that the temperature monitoring module monitors in real time that the operating temperature is within a fourth-level temperature monitoring interval, the operating temperature is abnormal, and the temperature protection mode is triggered; and the signal control module interrupts transmission of the output signal to the system, the laser switch module turns off the laser, the galvanometer drive module turns off the galvanometer motor, and the system is turned off and restarted; and each time the predetermined trigger time period t2 expires, the active temperature protection mode is exited, and the control element of the protection device resumes to the original state, and the temperature monitoring module monitors the operating temperature in real time.

8. The operating method of the protection apparatus for the galvanometer laser system according to claim 4, wherein in the position protection mode, a rated swing interval is predefined; wherein in the case that the position monitoring module monitors in real time that the swing position exceeds the rated swing interval, the swing position is abnormal, the position protection mode is triggered, within a predetermined trigger time period t3, the signal control module controls the output signal transmitted to the system to decrease to the predetermined first signal value, and the other modules of the control element maintain an original state; and each time the predetermined trigger time period t3 expires, the active position protection mode is exited, the control element of the protection device resumes to an original state, and the position monitoring module resumes monitoring the swing position.

9. The operating method of the protection apparatus for the galvanometer laser system according to claim 4, wherein in initial start of the system, the position monitoring module and the temperature monitoring module of the protection device pre judge whether monitoring data of the operating temperature and the swing position are acquired; wherein in the case that the monitoring data of the operating temperature and the swing position is normally acquired, the signal control module controls the output signal to be normally transmitted to the system, the laser switch module turns on the laser, the galvanometer drive module turns on the galvanometer motor, and the system resumes to a normal operating state; and in the case that any of the monitoring data fails to be normally acquired, the signal control module interrupts transmission of the output signal to the system, the laser switch module turns off the laser, and the galvanometer drive module turns off the galvanometer motor.

10. The operating method of the protection apparatus for the galvanometer laser system according to claim 4, wherein in normal operating of the system, in the case that any of monitoring data of the operating current, the swing position, and the operating temperature fails to be acquired, the signal control module interrupts transmission of the output signal to the system, the laser switch module turns off the laser, and the galvanometer drive module turns off the galvanometer motor.

* * * * *